Figure 1:
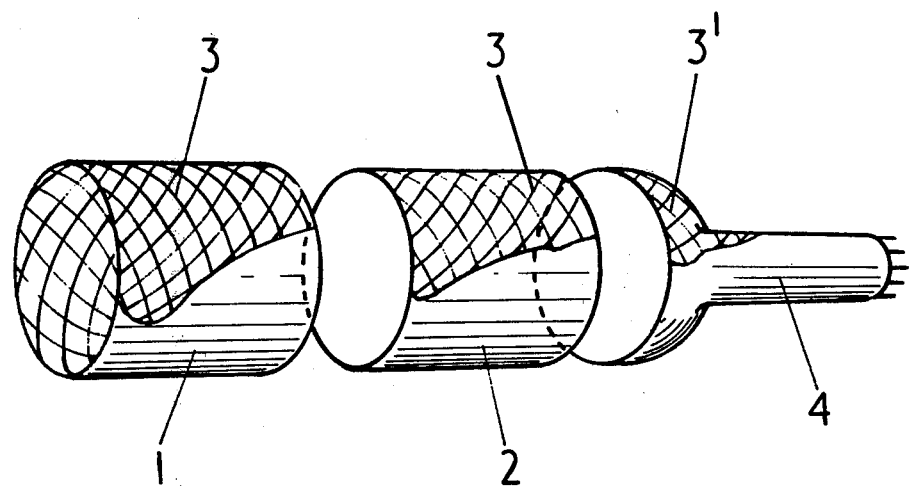

United States Patent [19]

Wykes et al.

[11] 4,323,778
[45] Apr. 6, 1982

[54] RADIATION DETECTORS SUPPORTED BY RESILIENT OPTICAL COUPLER

[75] Inventors: John S. Wykes, Allenton; Ian Adsley, Branston, both of England

[73] Assignee: Coal Industry (Patents) Limited, London, England

[21] Appl. No.: 911,868

[22] Filed: Jun. 2, 1978

Related U.S. Application Data

[63] Continuation-in-part of Ser. No. 911,247, May 31, 1978.

[51] Int. Cl.² .................................................. G01T 1/20
[52] U.S. Cl. ...................................... 250/367; 250/368
[58] Field of Search ............ 250/367, 366, 368, 361 R, 250/328

[56] References Cited

U.S. PATENT DOCUMENTS 3,073,954  1/1963  Carlson et al. ...................... 250/368
3,882,309  5/1975  Paap .................................... 250/367
3,890,505  6/1975  Olson ................................ 250/361 R
3,898,463  8/1975  Noakes ................................ 250/367
4,064,440 12/1977  Roder .................................. 250/368
4,158,773  6/1979  Novak ................................ 250/368

FOREIGN PATENT DOCUMENTS 7707065 12/1977 Netherlands ................... 250/361 R Primary Examiner—Alfred E. Smith
Assistant Examiner—Carolyn E. Fields
Attorney, Agent, or Firm—James C. Wray

[57] ABSTRACT

A sensor which is robust for use in an industrial environment. The sensor employs two scintillation crystals to offer a sufficient crystal volume and the crystals are optically coupled through a silicone rubber compound. The compound also allows the crystals to vibrate independently so that they do not shatter. A single photomultiplier detects scintillation occurring in all the crystals.

6 Claims, 5 Drawing Figures

U.S. Patent  Apr. 6, 1982  Sheet 3 of 3  4,323,778

RADIATION DETECTORS SUPPORTED BY RESILIENT OPTICAL COUPLER

This is a continuation-in-part of application Ser. No. 911,247 filed May 31, 1978 by John Stanton Wykes and Ian Adsley for A Method of and Apparatus for Determining the Proportion of at Least One Material in a Mining Mixture of Materials, which claims priority of British patent application No. 22,941 filed May 31, 1977.

This invention relates to radiation sensors and particularly, though not exclusively to such sensors for use in an industrial environment such as a coal mine.

One type of known radiation sensor employs a scintillation crystal to detect radiation. The crystal emits a scintillation i.e. a flash of visible light when struck by radiation such as gamma rays, each photon causing the emission of a flash. The scintillations are detected by a photomultiplier tube which in turn produces a variation in electrical output signal in response to the incident radiation.

Unfortunately, for some industrial applications, this type of radiation sensor has hitherto been unusable because in order to be sufficient sensitive the scintillation crystal has been large and because of its size has been too fragile.

Proposals have been made to use more than one sensor to detect the radiation but this too is inconvenient because the use of many sensors takes up too much space.

An object of the present invention is to mitigate the above disadvantages by providing a sensor which is sensitive enough for industrial applications and yet which is robust and compact.

Accordingly, the present invention provides a radiation sensor comprising at least two scintillation crystals, support means for supporting the at least two crystals and detector means for detecting scintillations caused in the crystals by radiation impinging thereon, the support means being transparent to electromagnetic energy within a frequency range including that of the scintillations and allowing the crystals to vibrate separately.

Preferably, the support means comprises a resilient material.

The resilient material is conveniently silicone rubber.

The resilient material is cut away from the scintillation crystals along the path of incident radiation into the sensor.

Advantageously, the crystals are coated with an optically opaque material on their faces away from the detector means or away from other crystals.

The support means is advantageously included in a light tight transparent container to incident radiation.

Preferably the light tight container is contained in a further container impermeable to the incident radiation, but having a window situated in the path of incident radiation.

Figure 2:
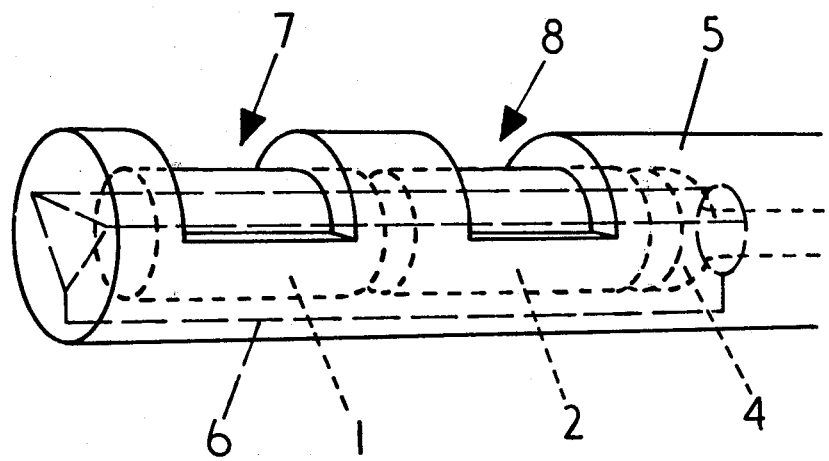
Figure 3:
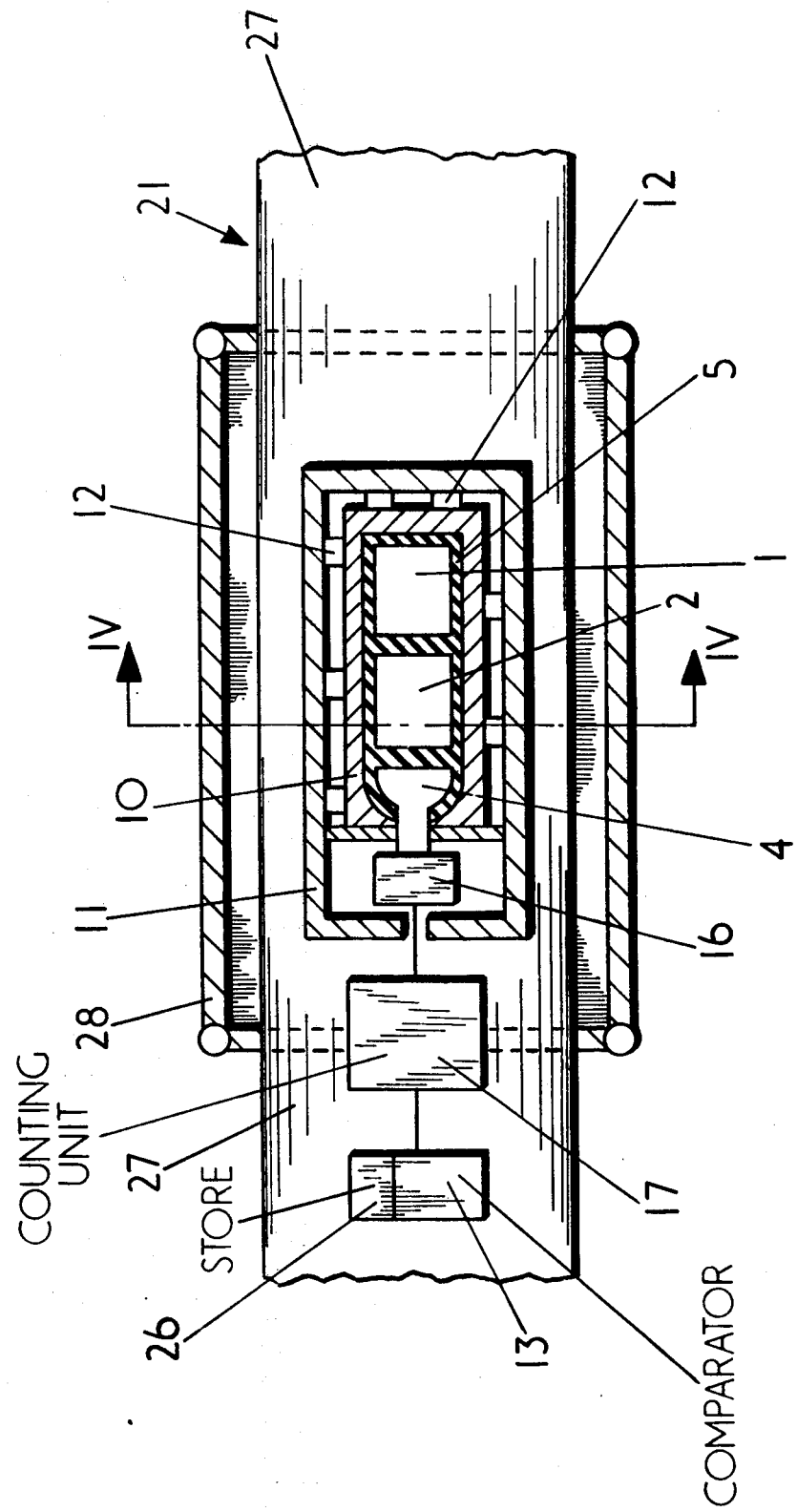
Figure 4:
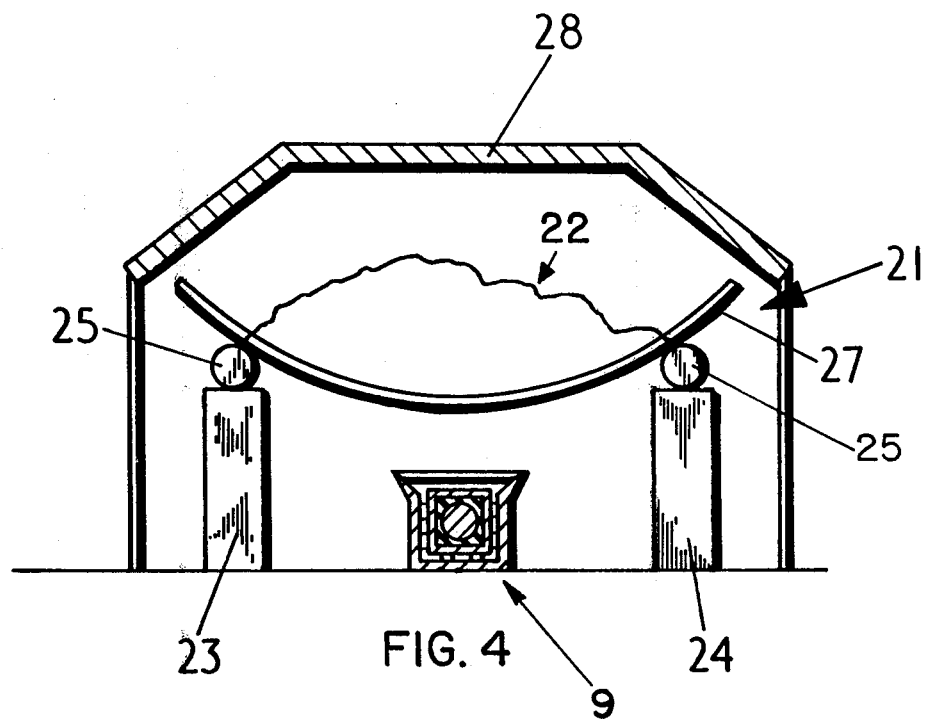
Figure 5:
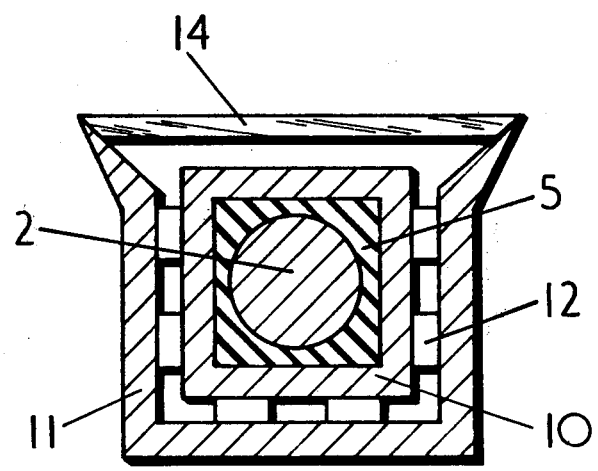

An embodiment of the present invention will now be described by way of example only with reference to accompanying drawings in which:

FIG. 1 is a diagrammatic side view of part of a radiation sensor including a crystal arrangement, FIG. 2 is a further diagrammatic side view of part of the radiation sensor including a support means for the crystal arrangement of FIG. 1, FIG. 3 shows a diagrammatic partly sectioned plan view of the radiation sensor in a working environment with some detail omitted, and FIGS. 4 and 5 are sectional views along IV-V of FIG. 3 and showing more detail.

A radiation sensor can find application in an industrial environment such as a coal mine wherein gamma rays emitted by materials are detected. Some of the gamma rays can be of low energy and in any case the intensity of the radiation is low. Consequently, it is necessary to employ a large scintillation crystal volume to detect the radiation.

Referring now to FIG. 1, there is shown a crystal arrangement of sufficient volume to detect the weak radiation which exists in a coal mine. Two scintillation crystals are shown at 1 and 2 respectively. Each crystal is of a generally cylindrical shape and is dimensioned such that its diameter is of substantially the same magnitude as its length. Such a dimension of crystal offers a greater resistance to shattering than other dimensions of crystal for example wherein the diameter is greater than the length or wherein the length is greater than the diameter.

The crystals 1 and 2 are coated with an optically opaque material 3. The opaque material 3 is only partly shown in the FIG. 1 for clarity but in fact it covers the curved faces of both crystals and the end face of crystal 1 away from crystal 2.

A photomultiplier tube 4 is situated adjacent to the crystal 2 on the side away from the crystal 1. The photomultiplier tube is also covered by a further optically opaque material partly shown at 3'. The crystal arrangement described ensures that optical activity occurring in either of the crystals 1 or 2 is visible to the photomultiplier tube 4, activity in crystal 1 being transmitted through crystal 2. External optical activity is cut off from the photomultiplier by the optically opaque material 3.

Referring now to FIG. 2, the crystal arrangement of FIG. 1 is shown supported by a flexible optical coupling which is preferably a resilient silicone rubber compound 5. The crystals and photomultiplier tube are again surrounded by the opaque materials 3 and 3' respectively, but this is omitted for clarity. The resilient silicone rubber compound 5 is cut-away over part of the crystals 1 and 2 and cut-outs 7 and 8 are shown adjacent to crystals 1 and 2, respectively. The cut-outs are provided so that low energy gamma rays can reach the crystal and not be attenuated in the silicone rubber.

Referring now to FIGS. 3, 4 and 5 the crystal arrangement is shown in a sensor which is situated in an industrial environment. Like reference numerals to FIGS. 1 and 2 are used for like parts.

The crystal arrangement which may be in a light skeletal support 6, is potted in a container 10 which is light in weight, gamma transparent and optically opaque. The skeletal support retains the crystals and photomultiplier tube in alignment during potting in the container 10. The skeletal support 6 is positioned away from the cut-outs 7 and 8. The container 10 is mounted in a container 11 which is substantially opaque to gamma radiation. Resilient pads 12 are inserted between the containers 10 and 11 to cushion the container 10 from vibration and shock received by the outer container 11.

In FIG. 4 the upper face of 14 of the sensor is shown. The face 14 is a window of a gamma transparent material preferable polycarbonate which has a high strength to weight ratio. The size of the gamma transparent window is adjusted so that all the radiation collected by the shielding i.e. radiation coming to the crystals from within the solid angle subtended at the crystals by the window, is received.

In FIG. 3 a high tension power supply 16 is shown connected to the photomultiplier tube 4. Electrical circuitry 17 comprising a counter is connected to the output of the photomultiplier tube. Further circuitry including a compactor 13 and a reference store 26 is connected to the output of the counting unit.

A conveyor 21 (only partly shown in FIG. 3) for transporting radioactive material 22 is shown passing over the radiation sensor. The conveyor 21 comprises support brackets 23 and 24 and rollers 25 and 26 mounted on the brackets 23 and 24 respectively. A conveyor belt 27 (or scraper chain arrangement) runs across the rollers 25.

A shield 28 is mounted over the conveyor to shield the sensor from stray radiation arising other than in the material on the conveyor.

In operation of the sensor radiation, comprising typically low energy gamma radiation is emitted from the material 22. The radiation passes through the conveyor to the sensor 9. The sensor receives the radiation through the window 14, the radiation being collimated by the shielding so as to be from a desired volume of interest for material on the conveyor and upon striking the scintillation crystals 1 and 2, the radiation causes light flashes. The flashes are detected by the photomultiplier tube 4 which derives an electrical signal in response to the flashes. Flashes in crystal 1 are seen by the photomultiplier tube 4 through the crystal 2.

The crystals 1 and 2 can vibrate separately in response to mechanical shock which may be experienced by the sensor 9 and so are not subject to forces which may cause them to shatter. Even so, the crystals are optically coupled by the transparent silicone rubber compound 5. The crystals can also vibrate independently of the photomultiplier tube 4. The optical shielding on the crystals prevents stray light from impairing their operation.

Consequently, the sensor 9 has a scintillation crystal arrangement which offers a crystal volume of twice the size of a single crystal but which does not have a large crystal which is liable to fracture in use and which use a single photomultiplier tube. Moreover, the crystal arrangement is long (and thin) so that it can be slid into restricted spaces whereas a single crystal of the same size would have a diameter equal to its length and so would be bulky.

In other embodiments of the invention a plurality of crystals could be provided, all optically coupled by silicone rubber. Such a sensor could then have a desired volume of crystal and yet avoid the problem of a large volume of crystal shattering.

From the above description it can be seen that the present invention provides a sensor which is robust in operation and yet which offers a sufficiently great volume of scintillation crystal to detect high and low energy gamma rays of low intensity.

We claim:

1. A radiation sensor comprising at least two scintillation crystals, resilient support means for supporting the at least two crystals in a desired operational configuration and detector means for detecting scintillations caused in the crystals by radiation impinging thereon, said support means being transparent to electromagnetic radiation within a frequency range including that of the scintillations, the support means further allowing the crystals to mechanically vibrate independently of one another, and having cutouts adjacent to the scintillation crystals along a path followed by incident radiation into the sensor.

2. A radiation sensor as claimed in claim 1, wherein the resilient material comprises silicone rubber.

3. A radiation sensor as claimed in claim 1, wherein the crystals are coated with a material on their faces away from the detector means or away from other crystals, the material being opaque to electromagnetic radiation within a frequency range including that of the scintillations.

4. A radiation sensor as claimed in claim 1, wherein the support means is contained in a container opaque to radiation in the frequency range but transparent to incident radiation.

5. A radiation sensor as claimed in claim 4, wherein the container is contained in a further container which is impermeable to the incident radiation, but which has a transparent window situated in the path of the incident radiation.

6. A radiation sensor as claimed in claim 5, wherein a mechanical cushioning means is inserted between the container and the further container.

* * * * *